(12) United States Patent
Benoit et al.

(10) Patent No.: US 7,726,455 B2
(45) Date of Patent: Jun. 1, 2010

(54) ELECTRO-MECHANICAL CLUTCH

(75) Inventors: Dominique Benoit, St. Jean le Blanc (FR); Franck Rivoiret, Sully-sur-Loire (FR); Thierry Pebre, Checy (FR)

(73) Assignee: ArvinMeritor Light Vehicle Systems —France, Sully-sur-Loire (FR)

( * ) Notice: Subject to any disclaimer, the term of this patent is extended or adjusted under 35 U.S.C. 154(b) by 474 days.

(21) Appl. No.: 11/740,958

(22) Filed: Apr. 27, 2007

(65) Prior Publication Data

US 2007/0267269 A1 Nov. 22, 2007

(30) Foreign Application Priority Data

May 18, 2006 (DE) .................. 10 2006 023 447

(51) Int. Cl.
*F16D 11/12* (2006.01)
*F16D 27/01* (2006.01)
*F16D 27/102* (2006.01)

(52) U.S. Cl. ............... 192/84.31; 192/84.8; 192/38; 192/114 R; 192/56.4

(58) Field of Classification Search ............... 192/84.8, 192/84.31
See application file for complete search history.

(56) References Cited

U.S. PATENT DOCUMENTS

| 2,843,237 | A | * | 7/1958 | Carr | 192/40 |
| 4,848,545 | A | * | 7/1989 | Nishimura | 192/26 |
| 6,471,017 | B1 | * | 10/2002 | Booz et al. | 188/72.7 |
| 6,641,476 | B2 | * | 11/2003 | French | 453/21 |

* cited by examiner

*Primary Examiner*—David D Le
*Assistant Examiner*—Ryan Dodd
(74) *Attorney, Agent, or Firm*—Carlson, Gaskey & Olds

(57) ABSTRACT

A clutch comprises an input pinion and an output pinion associated with a rotatable locking member that has a surface inclined with respect to an axis of rotation of the locking member. The surface cooperates with an engagement member, and the locking member is movable between a first position and a second position. In the first position, the surface forms a recess to receive the engagement member, and in the second position, the surface forms a projection to force the engagement member into abutment with the input pinion to establish a driveable connection between the input pinion and the output pinion.

16 Claims, 1 Drawing Sheet

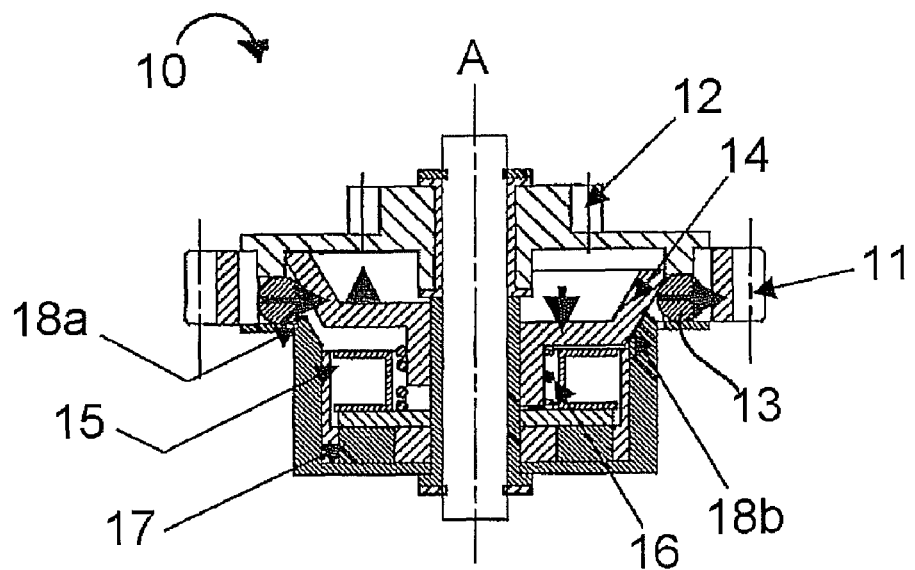
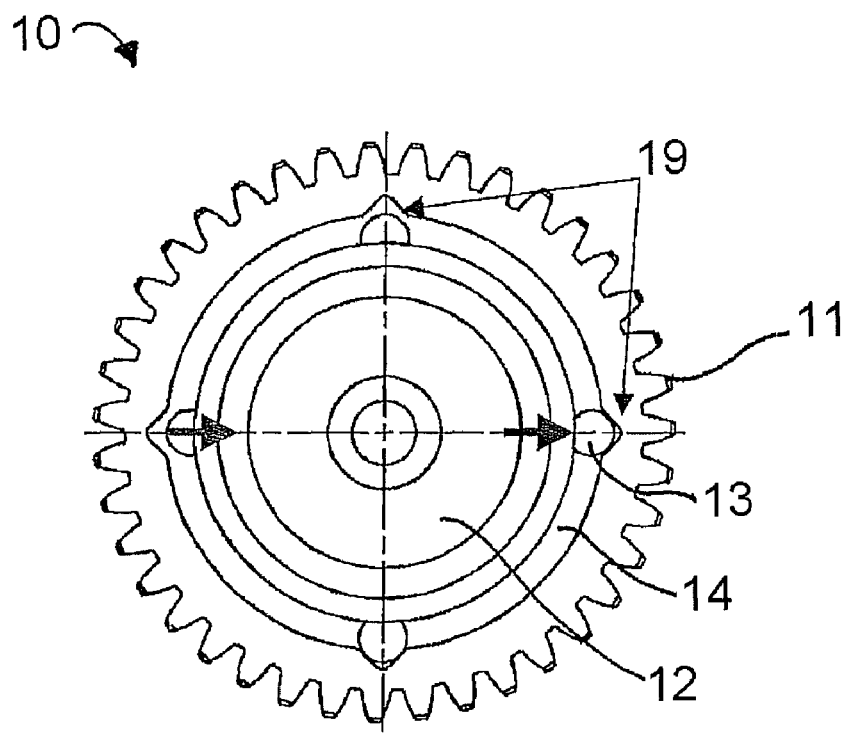
Fig. 1a)   Fig. 1b)
Fig. 2a)   Fig. 2b)

ELECTRO-MECHANICAL CLUTCH

RELATED APPLICATIONS

The application claims priority to German Application No. 10 2006 023 447.2, which was filed on May 18, 2006.

BACKGROUND OF THE INVENTION

The present invention generally relates to an electromechanical clutch. More particularly, but not exclusively, the present invention relates to an electromechanical ball clutch for use in a power driven system such as a motorized tailgate or hatchback door for a vehicle, for example.

In power driven systems, there is a need to provide a manual back-up mode in case there is a battery failure, for example. Such a manual back-up mode should provide an effort similar to a standard manual system. It is necessary to disengage a drive unit during the manual back-up mode and also when a user wishes to operate the system manually. One way of allowing disengagement of the drive unit is to provide an electromagnetic clutch between mechanical elements, for example between a motor and a reduction unit that benefits from a lower torque provided by the electromagnetic clutch.

In existing systems, clutching is done by clamping two metal plates together with a magnetic force produced by an electromagnetic coil. The transmitted torque is dependent on a coil pull force and a clutch diameter; i.e., the larger the required torque, the bigger the electromagnetic clutch needs to be. Therefore, in order to have an electromagnetic clutch that transfers a large torque, packaging and weight of the electromagnetic clutch must be increased, which is inconvenient and costly. To reduce the power demand on the electromagnetic coil, a permanent magnet can be added in the electromagnetic clutch to work in conjunction with an electromagnet. The permanent magnetic field of this magnet will then create a permanent drag in the system. When this system is used in a tailgate, for example, this drag can be used to hold the tailgate in an intermediate position without having to keep the power on to power the electromagnetic coil. However, the drag caused by the permanent magnet is very uncomfortable for a user operating a tailgate manually in the event of a power failure because the presence of drag means that it is very difficult to open and close the tailgate.

The present invention has been devised with the foregoing in mind.

SUMMARY OF THE INVENTION

Thus, the present invention provides a clutch that includes an input pinion, and an output pinion associated with a rotatable locking member with a surface inclined with respect to an axis of rotation. The surface cooperates with an engagement member, and the rotatable locking member is movable between a first position and a second position. In the first position, the surface forms a recess to receive the engagement member. In the second position, the surface forms a projection to force the engagement member into abutment with the input pinion to establish a driveable connection between the input pinion and the output pinion. The surface amplifies a force that acts on the engagement member, which results in a higher torque that can be transmitted in a small clutch package.

As the rotatable locking member slides from the first position to the second position, the rotatable locking member provides a recess for the engagement member that evolves into a projection in a smooth movement. This can be achieved by having a locking member with a frustro-conical shape or a substantially conical shape with sides tapering inwards towards an end furthest away from the output pinion.

In one example, the input pinion comprises a notch to receive the engagement member so that, when the locking member moves into the second position and pushes the engagement member into engagement with the input pinion, the engagement member engages with the notch. The notches permit the clutch to transmit a higher torque in a much smaller package.

In one example, the locking member and engagement members are ferromagnetic. In this example, the locking member is actuated to move between the first position and the second position by varying a magnetic field. The magnetic field can be provided by an electromagnetic coil. The engagement member can be a ball or a roller.

In one configuration, the locking member is biased in the first position by a spring, which is compressed as the locking member moves from the first position to the second position.

In one example, the clutch further comprises a permanent magnet that assists in holding the locking member in the second position. In the second position, which is also referred to as a closed position, there is only a small air gap between the locking member and the permanent magnet so that the permanent magnet pulls or biases the locking member with a relatively high force into the second position. This allows transmission of a high torque. In the first position, which is also referred to as an open position, the permanent magnet does not have sufficient strength to provide a force that can pull the locking member against a spring force. This is due to a large air gap between the locking member and the permanent magnet. However, the permanent magnet does have sufficient strength to hold the engagement members in contact with the locking member and thereby away from the input pinion when the locking member is in the first position. Thus, the addition of a permanent magnet and a spring gives two stable positions to the clutch in the open and closed positions.

Furthermore, if output of the clutch is maneuvered to reverse the mechanism, a certain amount of torque will be resisted due to the permanent magnetic force and, by virtue of the locking member being connected to the output, the load exerted by both the engagement members to the locking member and a spring compression load will overcome the force of the permanent magnet, and the locking member will return to the open position. To close the clutch again, it is necessary to pass current through the electromagnetic coil in a direction that will generate a magnetic field which, when added to the magnetic field from the permanent magnet, creates a force sufficient to compress the spring such that the locking member moves to the second position and the engagement member is forced into abutment with the input pinion.

To open the clutch electrically, current is passed through the electromagnetic coil in the opposite direction. A repulsive force is then generated by the electromagnetic coil, which cancels or counteracts that of the permanent magnet, and the spring pushes the locking member back to the first position.

The clutch is advantageously used in a mechanism moving an aperture such as a tailgate, a trunk lid, a hatchback or a sliding door, for example. When the mechanism is in a normal automatic mode, the mechanism is driven by a motor, and motor torque is transmitted through the clutch. When the motor is stopped, for example in the event of a power failure or if the user wants the aperture to be held in an intermediate position, the electromagnetic coil can be deactivated. The permanent magnet will produce enough force in the clutch to hold the aperture in the position the aperture was in when the current was stopped. In this position, the aperture can be moved electrically or manually. If the aperture is moved manually, a sensor can be provided in the system, which informs a control system of a manual movement. As soon as the movement stops during a defined time, the control system can activate the electromagnetic coil again so that the locking member is returned to the second position and the clutch is closed. Therefore, in the case of battery failure, even in the middle of an automatic maneuver when the clutch is engaged, the manual maneuver will automatically declutch the system and permit a movement with no drag on the clutch.

Further advantages and characteristics of the invention ensue from the description below, and from the accompanying drawings.

BRIEF DESCRIPTION OF THE DRAWINGS

FIG. 1a) is a left side view of a cross-section of a clutch in an open position according to the invention;

FIG. 1b) is a right side view of a cross-section of the clutch in a closed position according to the invention;

FIG. 2a) is a top left view of the clutch in the open position according to the invention; and FIG. 2b) is a top right view of the clutch in the closed position according to the invention.

DETAILED DESCRIPTION OF THE PREFERRED EMBODIMENT

Referring now to FIGS. 1a)-1b) and 2a)-2b), a clutch 10 has an input pinion 11 connected to a drive mechanism (not shown), for example an electric motor, which causes the input pinion 11 to rotate. The clutch 10 also has an output pinion 12 that is connected to a moving mechanism (not shown) that moves a tailgate, for example. The output pinion 12 is rotatable about a central axis of rotation A and is arranged to be freely rotatable on a central shaft. The input pinion 11 is provided with notches 19.

Associated with the output pinion 12 is a frustro-conical locking member 14 that has an inclined surface. The locking member 14 is also rotatable about the central axis of rotation A and is arranged rotatably on the central shaft to be capable of rotating synchronously with the output pinion 12. The inclined surface of the locking member 14 tapers inwards towards the end of the locking member 14 furthest away from the output pinion 12. A plurality of engagement members 13 is arranged between an inner surface of the input pinion 11 that has the notches 19 and a conical surface of the locking member 14. In this example, the engagement members 13 are formed as balls. In order to accommodate the balls, the output pinion 12 has fork-like structures or holes so that the balls are entrained rotationally when the output pinion 12 is rotated.

The locking member 14 is displaceable on the central shaft in a direction that is axial with respect to the central axis of rotation A between a first position that is shown in FIG. 1a) and which is referred to as the open position, and a second position that is shown in FIG. 1b) and which is referred to as the closed position.

In the first position, the engagement members 13 are in contact with a portion of the inclined surface that has a small diameter. This portion acts like a recess that allows the engagement members 13 to occupy a position that is close to the central axis of rotation A and spaced from the inner surface of the input pinion 11. In the second position, the engagement members 13 are in contact with a portion of the inclined surface that has a large diameter. This portion acts like a projection that urges the engagement members 13 radially outwards against the inner surface of the input pinion 11.

A spring 16 is positioned underneath the locking member 14 to bias the locking member 14 into the first position.

Further, an electromagnetic coil 15 is provided adjacent to the spring 16, and a permanent magnet 17 is arranged underneath the spring 16 and the electromagnetic coil 15. As the engagement members 13 and locking member 14 are made from a ferromagnetic material, the engagement members 13 are held spaced from the notches 19 of the output pinion 12 and in contact with the inclined surface when the locking member 14 is in the first position.

When the moving mechanism is idle, the clutch 10 is in the open position, as shown in FIGS. 1a) and 2a). The locking member 14 is biased by the spring 16 so that the locking member 14 is in a raised position. This causes the engagement members 13 abutting the locking member 14 to be in contact with a lower part of the locking member 14 towards an apex of the inclined surface. A magnetic loop passing through a housing, the engagement members 13 and the locking member 14 ensures that the engagement members 13 remain in contact with the lower part of the locking member 14. It can be seen that a lower part of a surface of the locking member 14 provides a recess into which the engagement members 13 fit. Thus, when the locking member 14 is in the raised position, the engagement members 13 are held away from and out of contact with the input pinion 11, and the input pinion 11 is free to rotate.

When it is required to operate the moving mechanism and close the clutch 10, as shown in FIGS. 1b) and 2b), an electric current is applied to the electromagnetic coil 15. The electromagnetic field produced by the electromagnetic coil 15 then acts on the locking member 14, which slides downwards in a direction parallel to the central axis of rotation A of the clutch 10, thereby compressing the spring 16. As the locking member 14 moves downwards, the locking member 14 slides against the engagement members 13, pushing them outwards. The locking member 14 thus forces the engagement members 13 towards the input pinion 11, by virtue of the surface of the locking member 14 being inclined outwards towards a top of the locking member 14 so as to form a wedge. Thus, the surface of the locking member 14 changes from forming a recess to forming a projection. At a maximum compression of the spring 16, the locking member 14 is at its lowest point with respect to the central axis of rotation A and maximum projection with respect to the engagement members 13. At this point, the surface of the locking member 14 forces the engagement members 13 into contact with input pinion 11 and then into the notches 19 provided on a circumference of the input pinion 11.

Thus, as the input pinion 11 rotates, the engagement members 13 are entrained into a rotational movement as they are engaged into the notches 19. The rotation of the engagement members 13 is transmitted, as the engagement members 13 are accommodated in holes or fork-like configurations of the output pinion 12, to the output pinion 12 as the locking member 14 prevents the engagement members 13 from escaping from the notches 19 of the input pinion 11. Finally, the moving mechanism is driven.

The notches 19 provided in the input pinion 11 permit the clutch 10 to have a higher transmitting torque in a much smaller package. The torque transmitted from the input pinion 11 to the output pinion 12 is dependent on the magnetic field generated by the electromagnetic coil 15; i.e., the coil pull force, the angle of inclination of the surface of the locking member 14 and the diameter of the engagement members 13.

The permanent magnet 17 is provided to reduce the required size of the electromagnetic coil 15 and to maintain the clutched position when power is off and forces applied to the clutch 10 are below a limit constituted by the torque plus the spring force tending to declutch. When the clutch 10 is closed, the force provided by the permanent magnet 17 pulls the locking member 14 with a force higher than the compression force of the spring 16 due to a small air gap 18b (about 0.2 mm), which permits the magnetic field to pass through the locking member 14. When the clutch 10 is open, the strength of the permanent magnet 17 is not sufficient to generate a force large enough to pull the locking member 14 downwards against the force of the spring 16. However, the strength of the field from the permanent magnet 17 is sufficient to pass through the engagement members 13 to keep them away from the input pinion 11.

If power to the electromagnetic coil 15 is cut, or if it is required to operate the moving mechanism manually, the moving mechanism connected to the output pinion 12 can be maneuvered manually. This places a certain torque on the output pinion 12 while the input pinion 11 is braked by motor and gear, for example. The tendency of the output pinion 12 to rotate biases the engagement members 13 out of the notches 19, resulting in a force that acts on the inclined surface of the locking member 14 in a radial direction. As a result of the inclination of the inclined surface, the radially acting force provides an axial component, which can make the locking member 14 overcome the holding force of the permanent magnet 17. This causes the locking member 14 to slide up to the raised position, the engagement members 13 to move away from the input pinion 11, and the clutch 10 to open so that the moving mechanism is no longer connected to the drive mechanism. The clutch 10 can also be opened electrically by passing current through the electromagnetic coil 15 in the opposite direction that causes the clutch 10 to close. This cancels out, or counteracts, the force of the permanent magnet 17, and the spring 16 can then push the locking member 14 to the raised position such that the engagement members 13 are brought out of contact with the input pinion 11.

Although the present invention has been described hereinabove with reference to specific embodiments, it is not limited to these embodiments and no doubt alternatives will occur to the skilled person that lie within the scope of the invention as claimed.

What is claimed is:

1. A clutch, comprising:
   an input pinion;
   an output pinion rotatable about an axis of rotation and associated with a rotatable locking member having a surface inclined with respect to the axis of rotation, the surface cooperating with at least one engagement member wherein the at least one engagement member and the locking member are ferromagnetic, and wherein the rotatable locking member is movable between a first position, in which the surface forms a recess to receive the at least one engagement member, and a second position, in which the surface forms a projection to force the at least one engagement member into abutment with the input pinion to establish a driveable connection between the input pinion and the output pinion; and
   a permanent magnet for applying a magnetic field to separate the at least one engagement member from the input pinion when the locking member is in the first position and to hold the locking member in the second position when the locking member is in the second position.

2. The clutch according to claim 1, wherein the locking member is actuated to move between the first position and the second position by varying a magnetic field.

3. The clutch according to claim 2, wherein the magnetic field is provided by an electromagnetic coil.

4. The clutch according to claim 1, wherein the at least one engagement member is a ball.

5. The clutch according to claim 1, wherein the at least one engagement member is a roller.

6. The clutch according to claim 1, wherein the input pinion comprises a notch configured to receive the at least one engagement member when the locking member is in the second position.

7. The clutch according to claim 1, wherein the locking member is biased in the first position by a spring.

8. The clutch according to claim 1, wherein the locking member is frustro-conical.

9. The clutch according to claim 1, wherein the at least one engagement member comprises a plurality of balls that are received in notches in the input pinion when the locking member is in the second position.

10. A clutch, comprising:
    an input;
    an output selectively driven by the input to rotate about an axis of rotation;
    a rotatable locking member associated with the output and having a surface inclined with respect to the axis of rotation;
    at least one engagement member cooperating with the surface such that the rotatable locking member is movable between a first position where the surface holds the at least one engagement member away from contact with the input, and a second position where the surface forces the at least one engagement member into abutment with the input to establish a driveable connection between the input and the output; and
    a permanent magnet actively operable to provide a stable clutch position in each of the first and second positions.

11. The clutch according to claim 10, wherein in one stable clutch position the permanent magnet is configured to hold the at least one engagement member in contact with the rotatable locking member and away from the input when the rotatable locking member is in the first position.

12. The clutch according to claim 11, including an electromagnetic coil and a resilient member configured with a force to bias the rotatable locking member toward the first position, and wherein in the other stable clutch position the permanent magnet assists in holding the rotatable locking member in the second position by cooperating with a magnetic force generated by the electromagnetic coil to pull and securely hold the rotatable locking member in the second position.

13. The clutch according to claim 12, wherein the permanent magnet has insufficient strength to pull the rotatable locking member against the force of the resilient member and into the second position when in the first position.

14. The clutch according to claim 10, wherein the at least one engagement member and the rotatable locking member are ferromagnetic.

15. The clutch according to claim 10, wherein the input comprises an input pinion that is connectable to a driving power source and wherein the output comprises an output pinion that is connectable to a moving mechanism configured to move a vehicle closure component; and wherein the surface of the rotatable locking member forms a recess to receive the at least one engagement member when in the first position and forms a projection to force the at least one engagement member into abutment with the input pinion when in the second position.

16. The clutch according to claim 15, wherein the output pinion and rotatable locking member are received within the input pinion such that the input pinion, output pinion, and rotatable locking member are concentric.

\* \* \* \* \*